Figure 1:
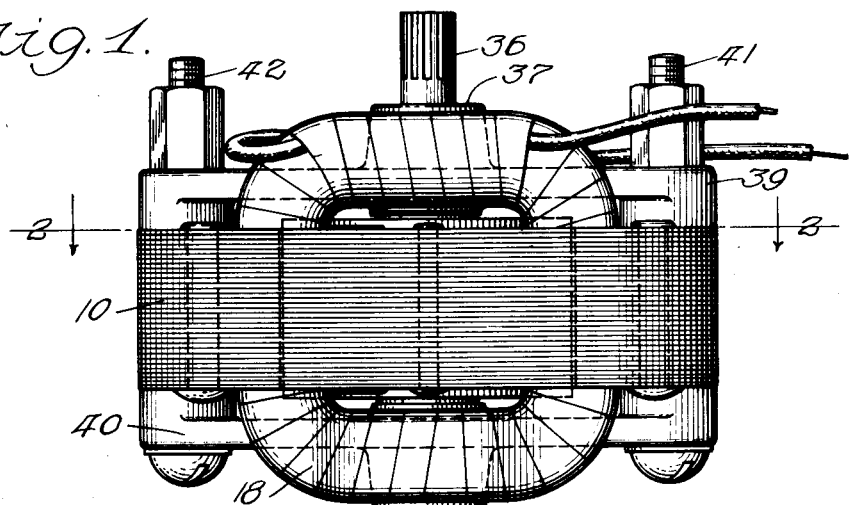

Feb. 16, 1937.　　　E. W. BALLENTINE　　　2,071,224

SHADED POLE INDUCTION MOTOR

Filed July 29, 1935

Inventor:
Earle W. Ballentine
By Byrnes, Stebbins, Parmelee & Tuttle
Attys.

Patented Feb. 16, 1937

2,071,224

UNITED STATES PATENT OFFICE 2,071,224

SHADED POLE INDUCTION MOTOR

Earle W. Ballentine, Chicago, Ill., assignor to Solar Industries, Inc., Chicago, Ill., a corporation of Illinois Application July 29, 1935, Serial No. 33,752

3 Claims. (Cl. 172—278)

This invention relates to improvements in electric motors. For the purpose of illustrating the invention, I have here shown the same embodied in a four-pole alternating current induction motor.

Among the features of this invention is the provision of a shading coil motor having a four-pole closed slot stator with coil slots adapted to contain two field coils on opposite poles of said stator, in which said coil slots are symmetrically arranged with respect to all four poles.

Another feature of this invention is the provision of a four-pole two-coil motor using shading coils in which adjacent poles are integrally joined with each other to form an integral magnetic bridge between poles.

Yet another feature of my invention is the proportioning of the narrowest portions of the integral magnetic bridge and the proportioning of the size of the shaded portion of each pole with respect to the unshaded portion to achieve a starting torque, pull out torque, and efficiency hitherto unobtained in such motors.

Other features and advantages of this invention will appear from the following specification and the drawing, in which—

Figure 2:
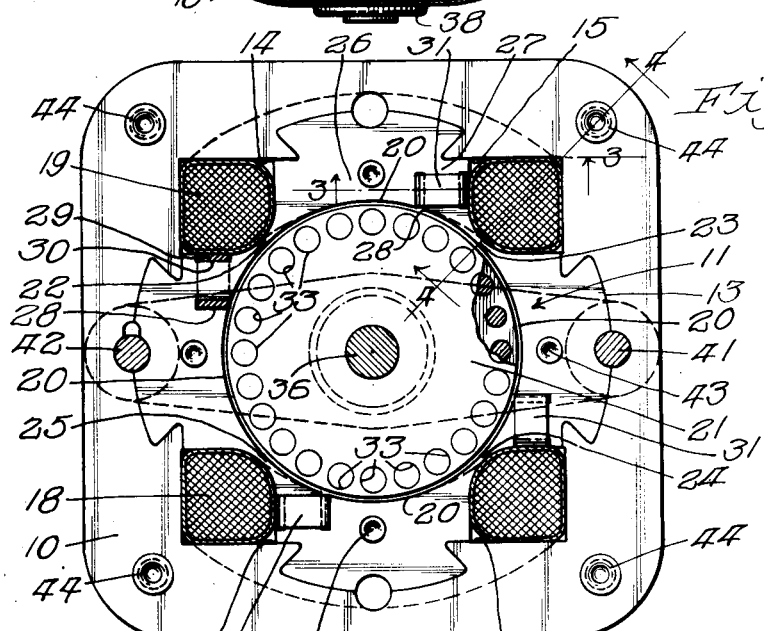
Figures 3, 4:
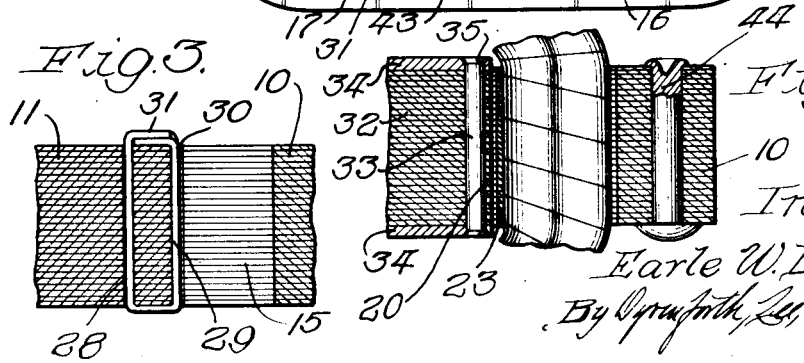

Fig. 1 is a top plan view of such a motor; Fig. 2 is a view, partly in section, along the line 2—2 of Fig. 1; Fig. 3 is a fragmentary view along the line 3—3 of Fig. 2; and Fig. 4, a fragmentary view along the line 4—4 of Fig. 2.

In the particular embodiment of the invention illustrated herewith, the stator comprises two sets of plates or laminations, the outer set being indicated by the reference numeral 10 and the inner set by the reference numeral 11. The inner plates are shaped somewhat analogously to a cross, as may be seen in Fig. 2. The outer plates or laminations 10 are substantially in the shape of an open square, with recessed portions corresponding to the four extending pieces 13 on the inner plates. The inner and outer plates are so shaped that openings 14, 15, 16, and 17 are adapted to receive the field coils 18 and 19. Each of the inner plates 11 has an opening 20 through the center thereof, this opening being adapted to accommodate the rotor 21. The openings 14, 15, 16, and 17 are separated from the rotor opening 20 by the integral bridges 22, 23, 24, and 25, respectively. Each pole 26 has a shaded portion 27, the shaded portion being separated from the remainder of the pole by a small slot 28. The shaded portion of the pole is surrounded by a shading coil 29, as is more clearly shown in Fig. 3. The shading coil 29 is a strip of copper or other metal of high conductivity passing completely around the shaded portion of the pole, lying in the slot 28 on one side thereof and in a groove 30 on the other side thereof. The copper strip is fastened into a continuous ring by brazing, soldering or the like, at some point, as at 31. There is thus a circular or continuous ring of magnetic metal entirely around the rotor without any gaps or slots except the small slots 28 which are adapted to receive the shading coils.

The rotor is composed of a series of stacked magnetic rotor laminations 32, conductor bars 33, and end rings 34 of copper or other material of high conductivity. The conductor bars 33 extend through openings punched in the magnetic laminations 32, and are riveted, as at 35, into the end rings 34. The rotor is axially mounted on a shaft 36, which shaft is journalled in bearings 37 and 38 carried by transverse members 39 and 40. These transverse members rest directly on the stator laminations, and are here shown as fastened thereto by the bolts 41 and 42.

The assembly of the motor may be outlined as follows. The inner and outer stator laminations are stamped out in the shape illustrated, the inner laminations 11 are alined and fastened together, as by the rivets 43, and the outer stator laminations are likewise alined and fastened together, as by the rivets 44. The shading coils may then be assembled in their proper position around the shaded portion of each pole. The rotor is then placed in the rotor opening 20 in the inner laminations, and the field coils 18 and 19, previously form-wound and tape-insulated, are then placed over a pair of opposite poles on the inner stator laminations. The inner laminations, the rotor, and the coils may then be placed in position over the central opening in the outer laminations, and slipped down into proper position therein. The laminations are preferably stamped so that the resultant fit is a tight one, thus insuring little or no increased reluctance to the magnetic flux at the junction points between the inner and outer laminations. It will be noted that the bolts 41 and 42 not only hold the transverse members 39 and 40 in position, but also positively lock the inner and outer laminations together, as may be seen in Fig. 2.

It has been found that in a four-pole induction motor of the shaded pole type described and illustrated heretofore, the proportion of the total pole flux passing through the shaded portion of the pole and the size of the narrowest portion of the integral magnetic bridge are highly important elements in the performance and efficiency of the motor. In a motor of this type the torque is a direct function of the shading coil inductance and the rotor resistance, and an inverse function of the rotor inductance and shading coil resistance. In order to have high starting and pull out torque it is thus important to have as large shading coil inductance and as low shading coil resistance as losses permit. The use of the integral magnetic bridges 22, 23, 24, and 25 increases the shading coil inductance through providing a shunt magnetic path with very low reluctance. The size of these bridges, however, must be carefully proportioned, since if they are too broad substantially all of the flux passes through the bridge and little or none passes through the rotor. It is only that portion of the flux passing through the rotor, of course, which provides driving force therefor. The cross-sectional area of the integral magnetic bridge must thus be proportioned to raise the inductance of the shaded pole, and yet not to divert such a large portion of the flux as to substantially decrease the amount thereof passing through the rotor. It has also been found that the proportion of flux passing through the shaded pole, and the relative circular lag thereof, are important. A pole designed, as here illustrated, such that the cross-sectional area of the shaded portion of the pole is from 10 to 40% of that of the entire pole gives good results. The preferred area is such that substantially 21% of the total flux of each pole passes through the shaded portion thereof, and the lag of that flux is from 25 to 30 degrees with respect to the flux passing through the unshaded portion of the pole.

Flux density and reluctance are functions of the cross-sectional area of the magnetic circuit at any particular point. In the particular motor described and illustrated herein an equal number of laminations are used throughout, and the cross-sectional areas of the magnetic circuit at any two given points, therefore, have the same ratio as the widths of a single lamination at those points. These ratios will hereafter be described as the ratio of the widths of a lamination at two given points. It is to be understood, however, that when the width of the integral magnetic bridge at the narrowest point is described as being from 20 to 30% of the width of the shaded portion of the pole it is meant that the cross-sectional areas of the flux paths at those two points bear that ratio.

It has been found that the width of the narrowest portion of the integral magnetic bridge is a function both of the rotor diameter and of the width of the shaded portion of the pole. The highest torque and the best efficiency combination is obtained when the width of this bridge is from 1½ to 5% of the rotor diameter, and from 10 to 40% of the width of the shaded portion of the pole. In a motor proportioned in accordance with that illustrated in Fig. 2, the width of the integral magnetic bridge, at its narrowest point, should be substantially 2.8% of the rotor diameter to give the best results, and substantially 24% of the width of the shaded portion of the pole. The total pole width is also of considerable importance, and the pole width should be from 60% to 75% of the diameter of the rotor, being here illustrated at its preferred value of 66%.

The particular motor heretofore described and illustrated gives a combination of torque and efficiency never before attained in a motor of the shaded pole type. A motor of these proportions, with a 2¼ inch rotor, develops a rated full load speed of 1700 R. P. M., a speed higher than that heretofore achieved under full load by motors of this type. The starting torque is about 160% of the rated full load torque, and the pull out torque is about 250% of the rated full load torque. The speed regulation under full load is very good, since the torque curve at 1700 R. P. M. is rather steep. The torque curve, from its starting point to its pull out point, is substantially a straight line curve, without the decrease in torque usually found at a point substantially corresponding with the third harmonic of the current supplied to the motor. Despite the high starting and acceleration torque, starting current is only about twice running current, and there is thus no danger of a burned out motor if it is unable to start the load. The motor hitherto described and illustrated as an embodiment of this invention, even though it provides high starting and accelerating torque, has a very good over-all electrical efficiency. The peak efficiency of this motor, at a speed just under the rated full load speed, is from 30 to 35%, an efficiency equal to that of a resistance split-phase type of motor of a similar rotor diameter.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I regard as new, and desire to secure by Letters Patent, is:

1. An induction motor of the shaded pole type, having at least four poles, including: a rotor; a stator having poles of a width less than 75% of the diameter of said rotor, an integral magnetic bridge the narrowest portion of which is from 1½ to 5% of the diameter of said rotor and a shaded portion of each pole of a width of from 20 to 30% of the width of the entire pole; and a field coil.

2. A four pole single phase induction motor of the shaded pole type, including: a rotor; a stator having poles of a width from 60% to 75% of the diameter of said rotor, an integral magnetic bridge between each of said poles, the narrowest portion of which bridge is from 2 to 4% of the diameter of said rotor, and a shaded portion of each pole of a width of from 20 to 30% of the entire width of said pole; and a field coil.

3. A four pole single phase induction motor of the shaded pole type, including: a rotor; a stator having poles of a width substantially 66% of the diameter of said rotor, an integral magnetic bridge between each of said poles, the narrowest portion of said bridge being substantially 3% of the diameter of said rotor, and a shaded portion of each pole of such a size that substantially 21% of the total flux in said pole passes through said shaded portion; and a field coil.

EARLE W. BALLENTINE.